United States Patent [19]
Wallace

[11] 4,290,006
[45] Sep. 15, 1981

[54] PROPORTIONAL A-C POWER CONTROL

[76] Inventor: Joseph T. Wallace, 4401 S. Juniper, Tempe, Ariz. 85282

[21] Appl. No.: 80,582

[22] Filed: Oct. 1, 1979

[51] Int. Cl.³ ............................................. G05F 1/455
[52] U.S. Cl. .................................... 323/326; 323/324
[58] Field of Search ...................... 323/19, 21, 24, 34, 323/38; 307/252 T, 252 B, 252 UA

[56] References Cited
U.S. PATENT DOCUMENTS

| | | | |
|---|---|---|---|
| 3,821,634 | 6/1974 | Sabolic | 323/38 |
| 3,952,242 | 4/1976 | Ukai | 323/24 |

OTHER PUBLICATIONS

G. J. Granieri, "Application of the RCA-3058 and RCA-3059 Zero-Voltage Switches in Thyristor Circuits", Application Notes ICAN-6158, Mar. 1970, pp. 1–12.

*Primary Examiner*—William M. Shoop
*Assistant Examiner*—Peter S. Wong
*Attorney, Agent, or Firm*—Warren F. B. Lindsley

[57] ABSTRACT

An improved proportional A-C power control for use in welding apparatus and other equipment to obtain smooth and continuous phase control particularly with inductive loads and requiring minimized current demands on the control circuit voltage source.

8 Claims, 4 Drawing Figures

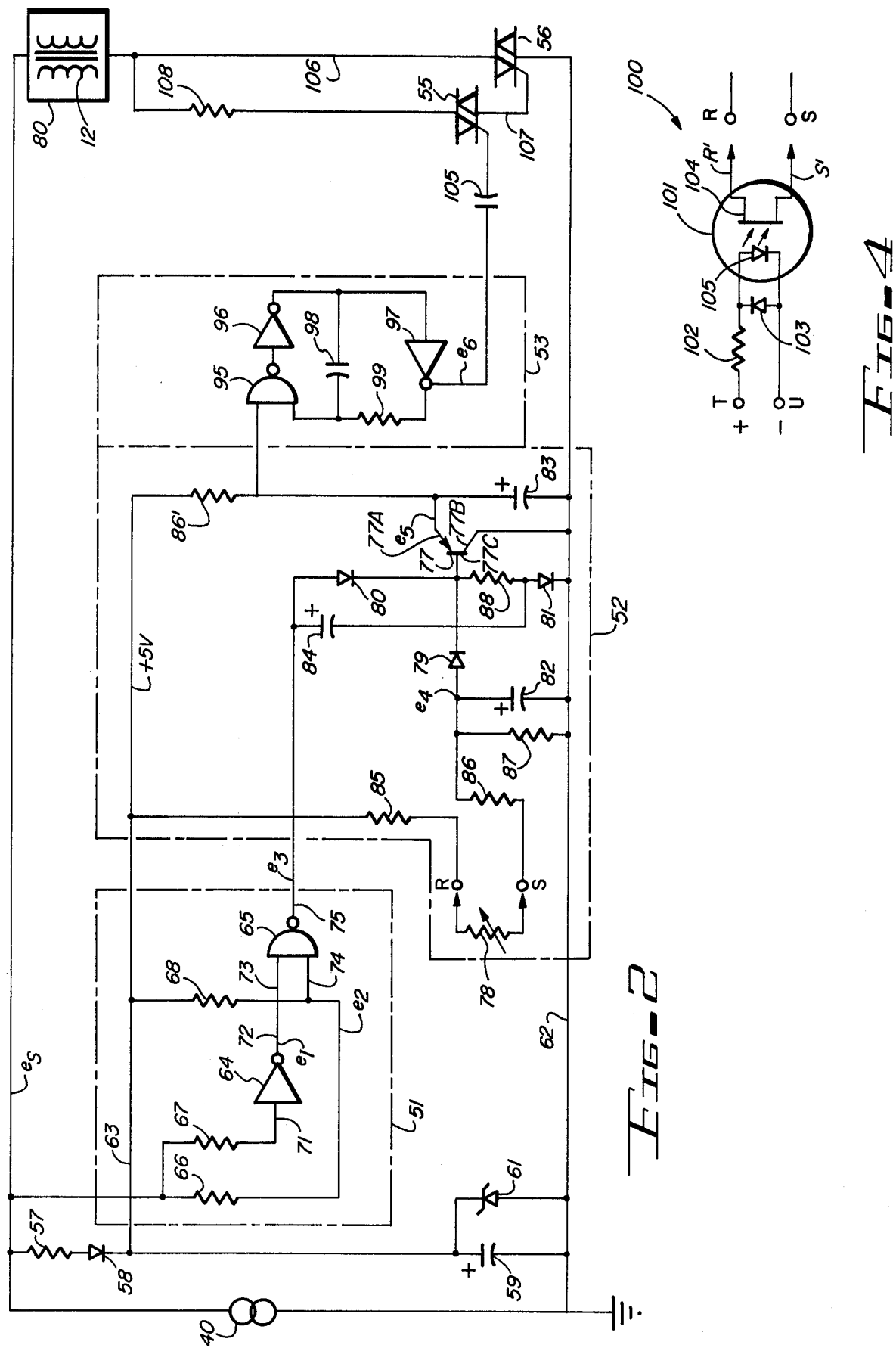

PROPORTIONAL A-C POWER CONTROL

BACKGROUND OF THE INVENTION

U.S. Pat. Nos. 3,262,872, W. A. Rhodes et al, and 3,346,470, R. W. Henes, describe apparatus which produces hydrogen and oxygen electrolytically from water. The gases produced are employed directly as fuels for welding and cutting torches incorporated as a part of the same apparatus.

The electrical current for the electrolysis process is supplied through a step-down transformer and rectifier and its control is accomplished by means of a solid state phase-control circuit located ahead of the step-down transformer. Because the transformer constitutes an inductive load on the phase-control circuit, however, the conventional phase-control circuit is not as effective as desirable in providing smooth continuous control over the full range of current required for the process.

The present invention addresses this problem and discloses improved electronic control circuits which provide the smooth continuous control and other features desired for this and similar applications.

SUMMARY OF THE INVENTION

In accordance with the invention claimed, an improved solid state proportional A-C power control is provided for the smooth and continuous regulation of current supplied for various purposes including the electrolysis process.

It is, therefore, one object of this invention to provide an improved electronic circuit for the control of voltage or current supplied to a load.

Another object of this invention is to provide in such a circuit a capability for achieving smooth and continuous control over the full range of current or voltage from an off to an on condition.

A further object of this invention is to provide such a capability for smooth and continuous control even though the load may have a lagging component of current as in the case of transformer or inductive loads.

A still further object of this invention is to provide such smooth and continuous control by a means which establishes its timing reference relative to the source voltage zero-crossover point.

A still further object of this invention is to provide in such a control circuit the reliable triggering of the solid state switching element through the supply of substantially continuously available trigger signals during the desired conduction period.

A still further object of this invention is to minimize the energy demand of the control circuit through the use of repetitive, low-energy pulses as the triggering signals for the switching element, and through the incorporation therewith of a pilot triggering element for amplification of the triggering signals.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 2 is a schematic diagram showing an embodiment of the control circuit of the invention;

FIG. 4 is a schematic diagram of an isolating network which may be employed with the circuit of FIG. 2.

DESCRIPTION OF THE PREFERRED EMBODIMENT

Figure 1:
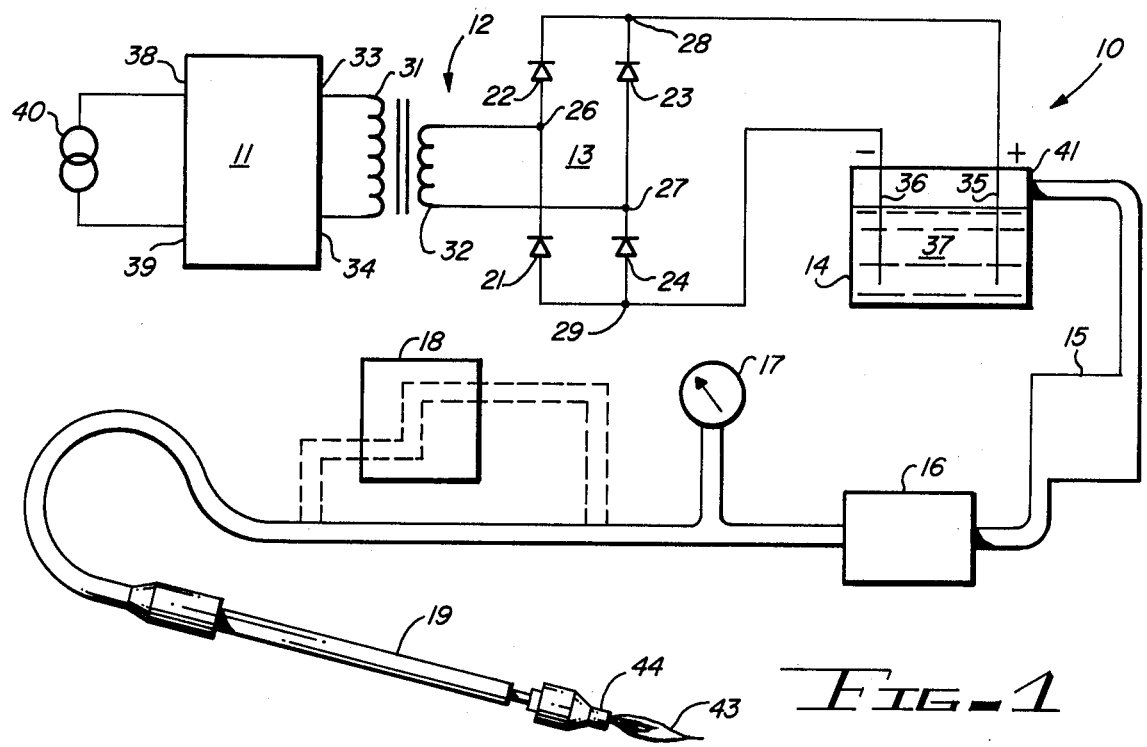
FIG. 1 is a functional block diagram showing the connection of the electronic control circuit of the invention to the welding apparatus with which the application of the invention is operable.

Referring more particularly to the drawing by characters of reference, FIG. 1 discloses the welding and cutting apparatus 10 in which the electronic control circuit 11 is intended to be employed. In addition to the control circuit 11 the apparatus 10 comprises a step-down transformer 12, a single-phase, full-wave bridge rectifier 13, an electrolytic cell or gas generator 14, a mixing chamber 15, a filter 16, pressure gage 17, a booster 18 and a torch 19.

The bridge rectifier 13 is a well-known configuration of four diodes 21, 22, 23 and 24. It is provided with two a-c input terminals 26 and 27, a positive output terminal 28 and a negative output terminal 29.

Transformer 12 has a high voltage primary winding 31 and a low voltage secondary winding 32. Winding 31 is connected to the output terminals 33 and 34 of the control circuit 11.

Gas generator 14 has a positive plate 35 and a negative plate 36, both of which are immersed in a solution 37 of distilled water and an electrolyte employed for catalyzing the dissociation of the hydrogen and oxygen in the solution. The positive plate 35 is connected to the positive terminals 28 of rectifier 13 and the negative plate 36 is connected to the negative terminal 29. The d-c current supplied by rectifier 13 in passing from plate 35 through solution 37 to plate 36 causes oxygen and hydrogen gases to be generated at the positive and negative plates, respectively. The oxygen and hydrogen generated are in the ideal 2 to 1 ratio for combustion.

The control circuit 11 has its input terminals 38 and 39 connected to an alternating current source 40 which is typically 120 volts, 60 hertz. The control circuit 11 controls the voltage supplied to transformer 12 and hence also the current supplied to generator 14 through rectifier 13. In this way it is possible to control the amount of oxygen and hydrogen generated.

The gases 41 thus evolved in generator 14 pass through the mixing chamber 15 through filter 16 and on to torch 19 where they burn, producing the flame 43.

The pressure gage 17 continuously indicates gas pressure at the tip 44. The pressure may be readily adjusted by means of a potentiometer associated with control circuit 11. The size of the flame 43 produced by torch 19 is a function of both gas pressure and the diameter of the tip 44.

Flame temperature is normally 6,000° F., but may be reduced with an increase in BTU content by using the booster 18. The booster 18 contains methyl alcohol through which the gases bubble and entrain the alcohol before combustion. The presence of the alcohol also imparts reducing characteristics to the flame.

A first embodiment of the control circuit 11 is shown in FIG. 2. The control circuit 11 is a phase control circuit comprising a zero-crossover detector 51, a timing circuit 52, an oscillator 53, a pilot triac 55 and a power triac 56.

A low current, five-volt source is incorporated in control circuit 11 for the operation of the logic and control elements, the source comprising resistor 57, rectifier diode 58, filter capacitor 59 and zener diode 61. Resistor 57, diode 58 and capacitor 59 are serially connected across the a-c source 40 in the order just enumerated. The negative plate of capacitor 59 is connected to the grounded side 62 of source 40, and the cathode of diode 58 is connected to the positive plate of capacitor 59. Zener diode 61 is connected in parallel with capacitor 59, its cathode to the positive plate and its anode to the negative plate. A five-volt potential is developed across capacitor 59 and is distributed to circuits 51, 52 and 53 by line 63.

Cross-over detector 51 comprises two conventional CMOS gates 64 and 65 and three resistors 66, 67, and 68.

Figure 3:
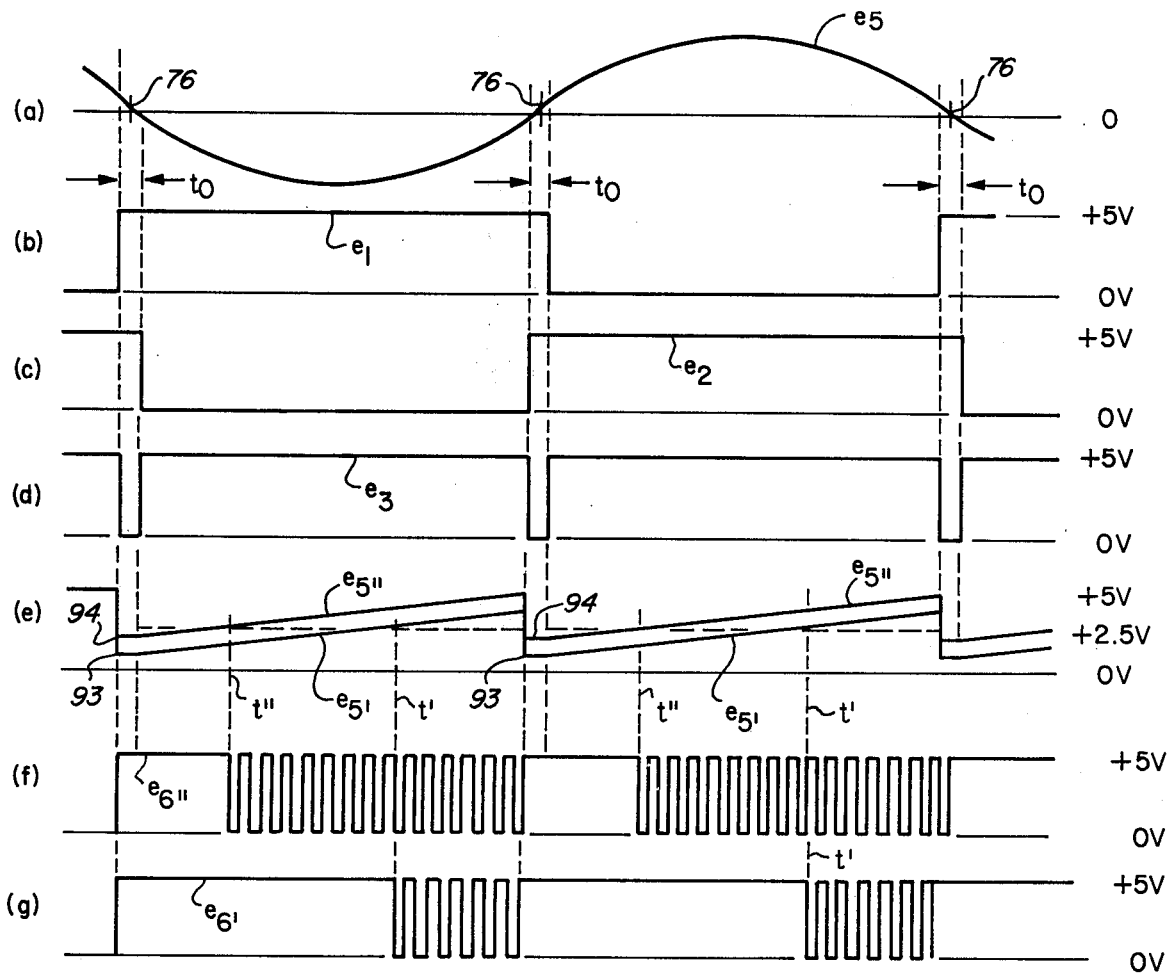
FIG. 3 shows the operating voltage waveforms of the circuit of FIG. 2.

Gate 64 is connected as an inverter with its input terminal 71 connected to the ungrounded side of source 40 through resistor 67. Its output terminal 72 is thus "high" (near +5 volts) whenever source 40 is negative and is "low" (near zero volts) when source 40 is more positive than +2.5 volts, which is the threshold voltage for the CMOS gates employed. FIG. 3(a) shows the voltage $e_s$ from source 40 and FIG. 3(b) shows the voltage $e_1$ developed at terminal 72 of gate 64.

Gate 65 is a two-input NAND gate. It has two input terminals 73 and 74, and an output terminal 75. Its output terminal goes "low" when both input terminals are "high". If either or both input terminals are "low", its output terminal is "high". Input terminal 73 of gate 65 is connected directly to output terminal 72 of gate 64. Input terminal 74 is connected through resistor 66 to the ungrounded side of source 40 and through resistor 68 to the +5 v line 63. The relative values of resistors 66 and 68 are such that the voltage $e_2$ supplied to the input terminal 74 is more positive than the +2.5 volt threshold whenever the source voltage $e_s$ is more positive than −2.5 volts. The effective voltage $e_2$ present at input terminal 74 under these conditions is as shown in FIG. 3(c).

Examination of FIGS. 3(b) and 3(c) will now show that voltages $e_1$ and $e_2$ are both positive during the brief interval $t_0$ coincident with each zero-crossover point 76 of source voltage 40 as shown in FIG. 3(a). Accordingly, the voltage $e_3$ delivered at output terminal 75 of gate 65 is "low" during the interval $t_0$; at all other times $e_3$ is "high". Voltage $e_3$ is shown in FIG. 3(d) in proper time relationship with voltages $e_s$, $e_1$ and $e_2$ of FIG. 3(a), 3(b) and 3(c).

The inputs of gates 64 and 65 are internally diode-clamped to ground and to +5 volts so that connection to a-c source 40 through high resistances 66 and 67 is permissible without danger of voltage breakdown.

Timing circuit 52 comprises a PNP transistor 77, an external adjustable resistor 78, diodes 79, 80 and 81, capacitors 82, 83 and 84 and fixed resistors 85, 86, 87 and 88.

The adjustable resistor 78, fixed resistors 85, 86 and 87, and capacitor 82 are connected as shown to develop an adjustable d-c reference voltage $e_4$. Resistors 78, 85, 86 and 87 are serially connected in the order listed between the five-volt line 63 and the grounded side of source 40. Resistor 78 is connected as shown across terminals R and S and may be adjusted to control the current through the series network and hence to control also the reference voltage $e_4$ which is developed across resistor 87. Capacitor 82 is connected in parallel relationship with resistor 87 with the negative plate connected to the grounded side of source 40.

Where it is desirable to provide d-c isolation between the manual or other control means and the timing circuit 52, the isolating network 100 of FIG. 4 may be substituted for the variable resistor 78.

The isolating network 100 comprises a photo-coupler 101, a resistor 102 and a diode 103. Photo coupler 101 comprises a photo-transistor 104 and a light-emitting diode (LED) 105 mounted in a common housing. When current is passed through the diode 105 it emits light, and the light strikes the transistor 104 causing the transistor to turn on or become conductive. The conductivity of transistor 104 is proportional to the current passed through the diode 105 and to the resulting light emitted. Thus, if a voltage is applied across terminals T and U of FIG. 4 of the polarity indicated, a current will flow through resistor 102 and through diode 105 equal, approximately, to the voltage applied divided by the resistance of resistor 102. As the voltage applied across the terminals T and U is increased, the current through diode 105 increases proportionately, and the impedance of transistor 104 as seen across its collector-emitter terminals R' and S' is accordingly decreased.

If the network 100 is substituted for resistor 78 in FIG. 2 with terminals R' and S' of network 100 connected to terminals R and S, respectively, of FIG. 2 as suggested in FIG. 4, a variable voltage applied at terminals T and U may be utilized to control the current through the series network, now comprising resistor 85, transistor 104, resistor 86 and resistor 87. As the voltage at terminals T and U is varied, the change in impedance resulting across terminals R and S produces a change in current through the series network and a corresponding change in the reference voltage, $e_4$.

It will be readily recognized that the change in voltage at terminals T and U may be provided in any number of ways. It may be supplied, for example, by an electronically programmed d-c source, or it may be provided by a fixed d-c source with a serially-connected variable resistance. The diode 103 protects the light-emitting diode 105 against voltage breakdown in the event a voltage of the wrong polarity is inadvertently applied across terminals T and U.

Capacitor 83 is the timing capacitor; its negative plate is grounded and its positive plate is connected through resistor 86' to the +5 volt line 63. Transistor 77 has its emitter 77A connected to the positive plate of capacitor 83 and its collector 77B connected to ground. The base 77C of transistor 77 is connected to ground through resistor 88 and diode 81, the cathode of diode 81 being connected directly to ground. Output terminal 75 of gate 65 is connected to the base of transistor 77 through diode 80 and the positive plate of capacitor 82 is connected to the base of transistor 77 through diode 79, the cathodes of both diodes, 79 and 80 being connected directly to the base of transistor 77. Capacitor 84 has its positive plate connected to the anode of diode 80 and its negative plate to the anode of diode 81.

In the operation of the timing circuit 52, when the voltage $e_3$ at the output terminal 75 of gate 65 is "high" a current flows through diode 80, through resistor 88 and diode 81 to ground. The voltage thus developed across resistor 88 and diode 81 raises the base voltage of transistor 77 to a positive level causing transistor 77 to be turned off, and thereby permitting timing capacitor 83 to be charged through resistor 86'. At the same time, capacitor 84 is charged to the voltage dropped across diode 80 and resistor 85.

When the voltage $e_3$ subsequently falls to zero at the crossover interval, the positive plate of capacitor 84 is clamped approximately to ground by output terminal 75 of gate 65. The prevailing charge on capacitor 84 causes its negative plate to be instantaneously negative with respect to ground and to serve as a current sink for transistor 77 base current flowing through resistor 88. Transistor 77 is thus turned on to discharge capacitor 83. It will be recognized, however, that capacitor 83 can only discharge through transistor 77 so long as the voltage at its positive plate is sufficiently positive with respect to the base of transistor 77 as to permit the flow of emitter-base current. The voltage at the base of transistor 77 is in turn, prevented from falling more than one diode drop below the reference voltage $e_4$, at which level it is sustained by a current flowing from the positive plate of capacitor 82 through diode 79. Capacitor 83 is thus prevented from being discharged to a voltage level lower than reference voltage $e_4$.

From the foregoing it is seen that the discharge of capacitor 83 is controllably limited to a desired level by means of $e_4$ which, in turn, is controlled by the adjustable resistor 78 or through the network 100.

The effect of $e_4$ on the operation of the timing circuit 52 is illustrated by the waveforms of FIG. 3(e) which shows the voltages $e_5'$ and $e_5''$ occurring at the positive plate of capacitor 83 for two values of voltage $e_4$.

A relatively low value of $e_4$ causes capacitor 83 to discharge to a low voltage level 93 during the interval $t_0$ with the result that the charging voltage $e_5'$ does not reach the threshold level (+2.5 v) until a time $t'$ occurring relatively late in each half cycle of source voltage $e_s$. A relatively higher value of $e_4$, however, prevents capacitor 83 from discharging to so low a value, in this case falling only to a level 94 as shown in FIG. 3(e). Because the voltage on capacitor 83 is initially at a higher level, its charging voltage waveform $e_5''$ crosses the +2.5 volt threshold at a considerably earlier time $t''$ each half cycle. Because the resistance values of resistors 78, 85, 86 and 87 are quite high, the control current required is very low. When the network 100 is employed, the current required through diode 105 is typically one milliampere or less.

In addition to providing control over the time at which $e_5$ reaches the +2.5 volt threshold, the reference circuit provides a soft-start function. When circuit 52 is first energized, capacitor 82 is at zero charge regardless of the setting of resistor 78. Under this condition capacitor 83 does not reach the +2.5 volt threshold until late in each half cycle. Because of the relatively long time constant involving capacitor 82 and the associated charging resistances, the reference voltage $e_4$ does not reach its set level until a considerable number of cycles after initial energization. Load current thus increases slowly from an initially low level.

Oscillator 53 comprises three CMOS gates 95, 96 and 97 conventionally connected for oscillation with a positive feedback capacitor 98 and a negative feedback resistor 99. Gate 95 is a two-input NAND gate and gates 96 and 97 are connected as inverters. One input of gate 95 is connected to the positive plate of timing capacitor 83, the point at which signal $e_5$ is developed. The output of gate 95 is connected directly to the input of gate 96 and the output of gate 96 is connected directly to the input of gate 97. The output of gate 96 is also connected through capacitor 98 to the second input of gate 95 and the output of gate 97 is connected to the same point through resistor 99. The oscillator 53 oscillates at a high frequency relative to the frequency of source 40 whenever signal $e_5$ is more positive than +2.5 volts; when $e_5$ is below +2.5 volts the oscillation is prevented. These conditions are illustrated in FIGS. 3(e), 3(f) and 3(g). FIG. 3(f) illustrates the operation of circuit 53 corresponding to timing circuit waveform $e_5''$ of FIG. 3(e) while FIG. 3(f) illustrates the operation of circuit 53 corresponding to timing circuit waveform $e_5'$ of FIG. 3(e). In either case, the voltage $e_6''$ or $e_6'$ is "high" whenever $e_5''$ or $e_5'$, respectively, is below the +2.5 volt threshold and is oscillatory when $e_5''$ or $e_5'$ is above the +2.5 threshold.

Inverter 97 also serves as an amplifier for supplying gate current to triac 55. The output terminal of inverter 97 is coupled to the gate of triac 55 through capacitor 105.

Capacitor 105 has a very small micro-farad rating, but the resulting low value of current supplied to the gate of triac 55 is sufficient because of the high gate sensitivity associated with triac 55. At the same time, the low value of load current supplied by oscillator 53 through capacitor 105 results in a low value of current demand from the +5 volt source supplied at line 63.

Because the oscillation of oscillator 53 continues for the remainder of each half cycle following the time $t'$ or $t''$ of FIG. 3(e), gate trigger signals are continuously available to triac 55 during the entire desired period of conductivity of triac 55 and its reliability of firing during this time is thus effectively assured.

The power triac 56 is serially connected with the load 80 across the a-c source 40. (In the utilization of the control circuit 11 with the apparatus 10 of FIG. 1, the load 80 comprises the primary winding of transformer 12.)

Serially connected from the upper main terminal 106 of triac 56 to its gate terminal 107 are a resistor 108 and the pilot triac 55, the lower main terminal of triac 55 being connected to gate terminal 107 and the upper main terminal of triac 55 being connected to the lower end of resistor 108.

In the operation of circuit 11 the pilot triac 55 is turned on by the low-energy signal from oscillator 53. If triac 56 is in a condition to be turned on, an amplified signal as required by triac 56 is provided by triac 55, the amplified signal being drawn from a-c source 40 rather than from the limited current five-volt source at line 63.

The control circuit 11 is thus seen to meet the stated objects of the invention. Because the timing circuit 52 is referenced through the zero-crossover circuit to the source 40 rather than to the load current half cycles as in the case of most prior art phase control circuits, the circuit 11 operates stably over all conditions of load. Because of the zero-crossover referencing, a partial saturation of the transformer core will not lead to instability as in prior art phase control circuits. Furthermore, the continuous availability of trigger signals assures reliable triggering to full load. Also, as stated earlier, the low energy trigger signal coupled with the use of the pilot triac reduces the power requirement on the auxiliary source 63. Finally, if total electrical isolation is required for safety or for other reasons, it will be recognized that the network 100 may be utilized and it may be energized from a separate isolated d-c source.

A practical and effective control circuit for the control of a-c current supplied to a load is thus provided in accordance with the stated objects of the invention.

Although but one embodiment of the invention has been illustrated and described, it will be apparent to those skilled in the art that various changes and modifications may be made therein without departing from the spirit of the invention or from the scope of the appended claims.

What is claimed is:

1. A control circuit connected to an alternating current source for providing smooth and continuous current regulation to connected loads comprising:
   a crossover detector for detecting the change in polarity of the alternating current source and generating a signal in response thereto,
   a timing circuit connected to said crossover detector for receiving said signal,
   said timing circuit being energized by said source for establishing an adjustable direct current reference potential and comprising a pair of capacitive means,
   one of said capacitive means functioning as a timing device and being charged by said source under the control of said signal,
   control means for receiving said signal and effecting the charging or discharging of said timing device depending on the value of said signal,
   the other of said capacitive means being charged by said adjustable reference potential and connected to said control means for preventing said timing device from discharging below a value related to said reference potential,
   whereby when said signal is relatively high said one of said capacitive means charges and when said signal drops to substantially zero it begins to discharge to a predetermined voltage value depending on the set value of said reference potential, said timing circuit generating an output signal relatively early in each half cycle of said source when said reference potential is high and generating an output signal relatively late in each half cycle when said reference potential is low.

2. The control circuit set forth in claim 1 wherein:
   said control means comprises a transistor the energization of which permits said timing device to discharge to a level corresponding to the value of said reference potential.

3. The control circuit set forth in claim 1 wherein:
   said timing circuit comprises means for adjustably controlling said reference potential.

4. The control circuit set forth in claim 3 wherein:
   said means for adjustably controlling said reference potential comprises an adjustable resistor.

5. The control circuit set forth in claim 3 wherein:
   said means for adjustably controlling said reference potential comprises an optical coupler,
   whereby the adjustable control current through the light-emitting diode incorporated in said optical coupler may be supplied by a voltage source that is isolated from said alternating current source.

6. The control circuit set forth in claim 3 in further combination with:
   an oscillator connected to said timing circuit,
   said oscillator being enabled by the output signal of said timing circuit,
   whereby said oscillator is disabled during the initial portion of each half cycle of said alternating current source while said one of said capacitive means is charging toward a threshold level and is enabled at the time said threshold level is reached and for the remainder of the half cycle.

7. The control circuit set forth in claim 6 in further combination with:
   a power triac having two main terminals and one gate terminal,
   said power triac having its said two main terminals connected in series with a load across said alternating current source and having its said gate terminal coupled to said oscillator,
   whereby said power triac is turned on by a low-energy signal developed by said oscillator.

8. The control circuit of claim 6 in further combination with:
   a power triac having two main terminals and a gate terminal,
   a pilot triac having two main terminals and a gate terminal, and
   a resistor,
   said power triac having its said two main terminals connected in series with a load across said alternating current source,
   said pilot triac having one of its said two main terminals connected through said resistor to one of said main terminals of said power triac, and having the other of its said two main power terminals connected to said gate terminal of said power triac, and
   said gate terminal of said pilot triac being coupled to said oscillator,
   whereby said pilot triac is turned on by low-energy signals from said oscillator and said power triac is turned on by current from said pilot triac as supplied through said two main terminals of said pilot triac and through said resistor from said alternating current sources so that the power demand from said phase control circuit is substantially reduced.

* * * * *